Oct. 12, 1943.  S. I. RUSSELL  2,331,425
THERMOSTAT
Filed Sept. 6, 1941
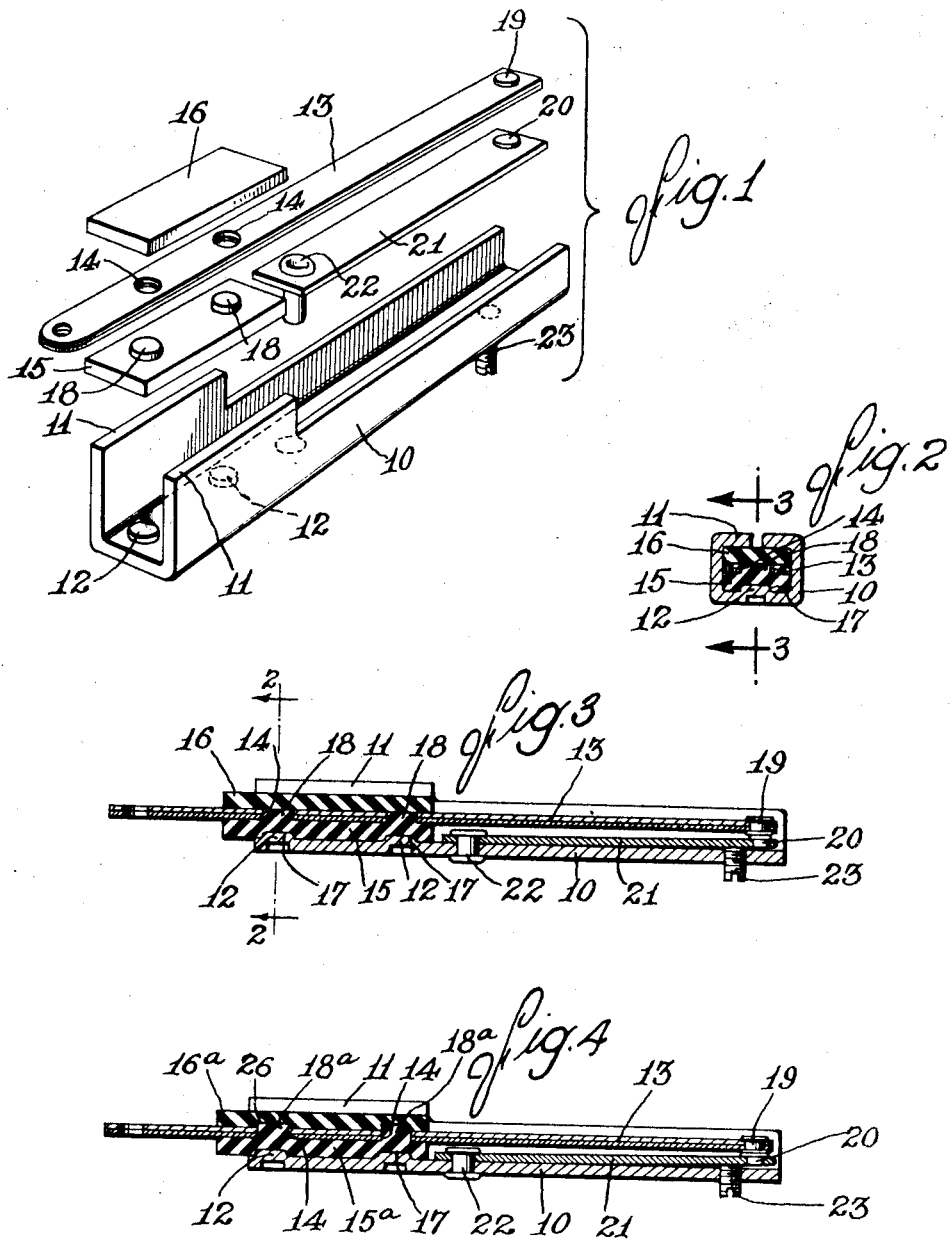
INVENTOR
Samuel I. Russell
BY
Parker, Carlson, Pigue & Hubbard
ATTORNEYS Patented Oct. 12, 1943

2,331,425

UNITED STATES PATENT OFFICE 2,331,425

THERMOSTAT

Samuel I. Russell, Chicago, Ill.

Application September 6, 1941, Serial No. 409,779

3 Claims. (Cl. 297—15)

The invention relates to thermostats and more particularly to the type embodying a bimetal element which is responsive to temperature variations to make or break an electric circuit at a predetermined temperature.

In the manufacture of relatively small thermostat units, such for example as those used in controlling the temperature of therapeutic heating pads, the various elements of the thermostat assembly are of such small size as to require extreme care and dexterity in the assembly and adjustment thereof. These operations and the calibration of the thermostat require a substantial amount of the time of a skilled operator and hence is a material factor in the cost of these units.

An object of the invention is to provide a new and improved thermostat which is durable, compact and rigid in construction and comprises a small number of parts capable of being quickly and easily assembled with a high degree of accuracy by a novel method, whereby the thermostat may be manufactured for sale at a relatively low cost.

More particularly stated, it is an object of the invention to provide a new and improved thermostat of the above-mentioned general type, embodying a base for supporting a thermal-responsive bimetal element between insulating spacers, the various parts being provided with novel means for facilitating assembly thereof in accurate alinement prior to the permanent assembly thereof.

Other objects and advantages of the invention will become apparent as the following description proceeds, taken in connection with the accompanying drawing, in which:

Figure 1 is an exploded perspective view of the various elements of a thermostat embodying the features of the present invention prior to assembly thereof.

Fig. 2 is a transverse vertical sectional view through the assembled thermostat and taken substantially along the line 2—2 of Fig. 3.

Fig. 3 is a longitudinal vertical sectional view taken on the line 3—3 of Fig. 2.

Fig. 4 is a longitudinal vertical sectional view similar to Fig. 3, and showing a slightly modified form of the invention.

The structure embodying the instant invention which has been selected for illustration is of a type particularly well adapted for use in apparatus wherein the thermostat is, of necessity, relatively small. Thermostats of this general type embody a plurality of parts such, for example, as flat insulating spacers and bimetal plates which, due to their small size, are difficult to assemble, aline and hold in alined position until they are permanently secured. Exact alinement, adjustment and security of assembly are of primary importance in a control device of this nature to assure accuracy of function and permanency of a calibrated setting. Accordingly, it has heretofore been necessary to use great care and considerable skill in manipulating the parts to their desired positions. I have provided a simple, yet effective, means and method, requiring no particular care or dexterity, for assembling the parts accurately in alined relationship in which they are positively retained until finally secured in their permanent relation.

Referring more particularly to Fig. 1 of the drawing, the illustrated embodiment of the invention has a base or frame 10 in the form of an elongated, U-shaped channel comprising the main supporting member of the thermostat. At one end of the channel frame the side walls project integrally upwardly to form ears 11. In the present instance, the ears extend through approximately one-third of the length of the frame. Stamped or otherwise suitably formed in the base of the channel frame and within the area over which the ears 11 extend, are a pair of substantially centrally located, longitudinally spaced projections 12 which extend upwardly within the channel. A thermal-responsive bimetal element 13, elongated in form and adapted to extend longitudinally and substantially centrally within the channel frame, is provided with a pair of apertures 14 substantially corresponding in location to the projections 12 formed in the base.

The thermal element 13 is rigidly supported, cantilever fashion, within the end of the channel member occupied by the projections and in spaced, insulated relation thereto to extend freely for thermal-responsive movement over the remaining length of the channel frame. To this end, a pair of insulating spacers 15 and 16, which in the present instance are approximately the same length as the ears 11, are adapted for assembly on the opposite sides of the bimetal element 13 to hold the latter in insulated and spaced relation with respect to the channel frame. The inner spacer 15 between the base of the channel and the bimetal element is stamped or otherwise suitably formed with a pair of recesses or indentations 17 on its bottom or base engaging face, and with a pair of projections 18 on its upper or element-engaging face. The indentations 17 and projections 18 may be and preferably are formed simultaneously by offsetting or in effect extruding portions of the body material laterally out of the plane of the body. The recesses and projections are spaced and dimensioned for closely fitting registration, respectively, with the projections 12 on the base of the channel and with the apertures 14 in the bimetal element 13 (as seen in Fig. 3). The spacer 16 is superimposed on the element 13 and the parts are clamped in position by bending or overturning the ears 11, as seen best in Fig. 2, to overlie the spacer 16 and clamp the parts in assembled relation.

Any suitable contact means may be provided at the remote or free end of the bimetal element 13 to make and break an electrical circuit as the strip flexes back and forth in response to changes in temperature. Thus, a suitable contact point 19 is secured in a customary manner to the free end of the bimetal element 13 for coaction with an opposed point 20 mounted on the end of an adjustable contact strip 21. The strip is of resilient material and is suitably secured by such means as a rivet 22 to extend substantially centrally of the channel frame in generally parallel relation with the bimetal element.

A set screw 23 screw-threaded in the base of the channel opposite to the free end of the strip 21 engages the strip for adjustment and calibration of the device. Since the contact strip 21 is resilient the set screw 23 will always be urged in one direction, thereby eliminating end play and consequent inaccuracy in the thermal control.

In the alternative embodiment illustrated in Fig. 4, the inner insulating spacer 15a is provided with projections 18a which are somewhat longer than the projections 18 formed on the spacer 15 to extend through and beyond the apertures 14 in the bimetal element 13. In this embodiment receiving apertures 26 are formed in the outer spacer 16a. The apertures 26 and 14 and the cooperating elongated projections 18a provide means for accurately alining the outer spacer 16a, the bimetal element 13, the bottom spacer 15 and channel base 10. Instead of using a differently formed outer spacer 16a a second spacer 15a may be employed. In this case the indentations 17 in the outer spacer coacts with the projections 18a on the inner spacer in determining alinement. The projection 18a on the outer spacer will in this arrangement be compressed when the ears 11 are overturned to increase the security of the assembly.

The preferred method employed in making the thermostat of the instant invention contemplates the following steps: As the channel frame 10 is formed with the ears 11 in the respective planes of the side walls, the two stamped indentations 12 in the base of the frame are also formed. The resilient member 21 is then secured to the base. When the inner or bottom spacer 15 is cut to size, it is also stamped to provide the two indentations 17 on one face and the two projections 18 (or 18a) on the other face. In the alternative embodiment illustrated in Fig. 4, the spacer 16a may be provided during its formation with the apertures 26. The bimetal element 13, during its forming operation, is provided with the apertures 14.

To assemble the parts, the inner spacer 15 is placed on the base of the frame 10 with the indentations 17 engaging the projections 12. The element 13 is then easily and quickly located in properly spaced relation to the frame by causing the apertures 14 to register with the projections 18. The outer spacer (16 or 16a depending on the length of the projections 18 or 18a) is then placed on the bimetal element 13 to complete this stack of three parts. During the course of such assembly operation, the necessity for carefully alining and holding the parts alined is obviated by the provision of the interfitting indentations, apertures and projections. With the present arrangement the simple act of stacking the parts one upon the other is effective definitely and accurately to arrange the parts in their correctly alined positions and spaced relationships. After the parts have been thus assembled, the ears 11 are overturned rigidly and permanently to secure the assembly.

It will be apparent from a consideration of the foregoing that I have provided a novel thermostat construction which is sturdy and rigid in construction and is extremely simple to assemble. The present invention is particularly well adapted for thermostats which are quite small since it eliminates the difficulties heretofore encountered in assembling with speed and accuracy the small parts of the unit.

I claim as my invention:

1. In a thermostat of the character described, the combination of an elongated channel-shaped frame having at one end a pair of ears, a pair of spaced projections stamped inwardly from the base of said frame at said one end, an elongated insulating spacer superimposed on said base in flat face-to-face registration therewith and having a pair of complementary indentations in its registered face engaging said projections, said spacer having a pair of spaced projections formed on its oposite face, an elongated bimetal element superimposed on said spacer in flat face-to-face registration therewith and having a pair of apertures engaged by said projections on said spacer, said element extending longitudinally of said frame and being free at its other end for thermal-responsive movement, and a second spacer superimposed on said bimetal element, said ears being overturned to engage the outer face of said second spacer and secure the superimposed parts together and to the frame.

2. In a thermostat of the character described, the combination of an elongated base having a projection formed near one end thereof, a bimetal strip having an aperture formed therethrough near one end thereof, an elongated insulating spacer between said element and said base and having a substantial flat face-to-face contact with said element and said base along its opposite sides respectively, said spacer having a projection on one face and an indentation on the other face for snug engagement respectively with said aperture in said element and said projection on said base, a second insulating spacer on the opposite side of said element, and a pair of ears integral with said base and bent over said second spacer to hold said spacers and said element in assembled relation.

3. In a thermostat of the character described, the combination of an elongated frame having projections formed therein adjacent one end thereof, an elongated bimetal element mounted to extend longitudinally of said frame and having apertures formed therein near one end thereof, an elongated insulating spacer between said element and said frame and having flat face-to-face contact with said frame for a substantial distance and having indentations formed in one side thereof and projections formed on its other side adapted respectively for registration with the projections in said base and for extension through the apertures in said element, and a second insulating spacer superimposed on the other side of said element and having means cooperating with the projections extending through said apertures for locating said second spacer with respect to said element.

SAMUEL I. RUSSELL.